J. E. CRISP,
Assignor to G. W. COPELAND.
Boot-Treeing Machine.
No. 9,124. Reissued Mar. 23, 1880.
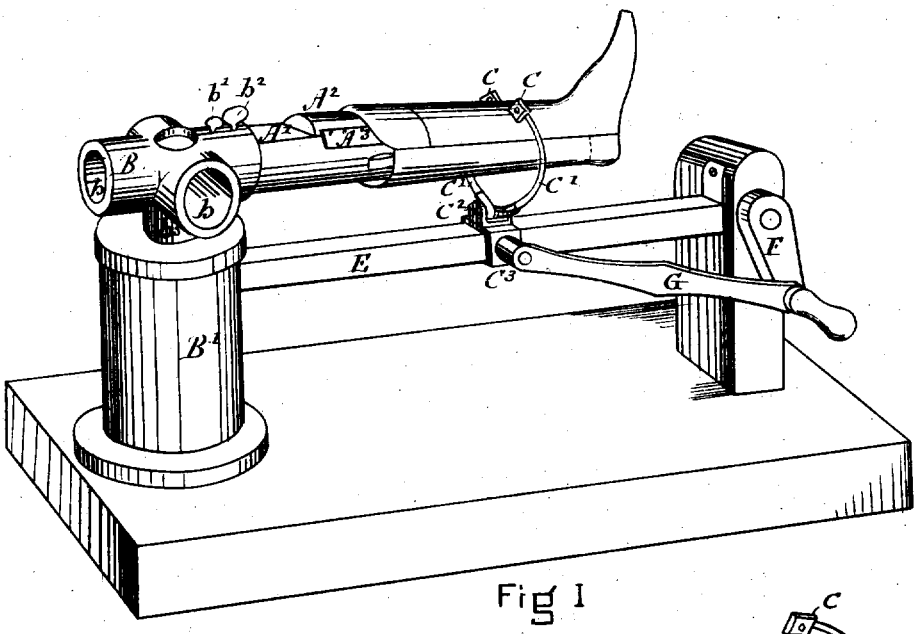
Fig 1
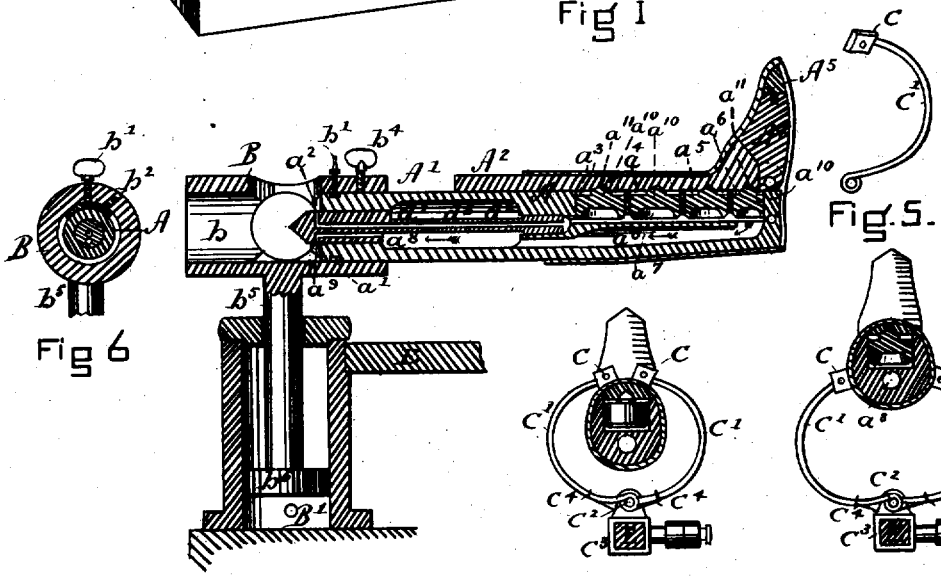
Fig. 2.
Fig 6
Fig. 3.
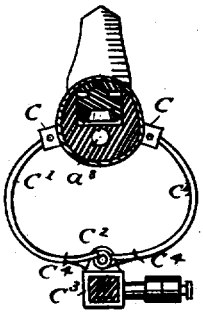
Fig. 4.
Fig. 5.
WITNESSES
C. C. Raymond 2d
M. H. Sawyer
INVENTOR
J. E. Crisp

UNITED STATES PATENT OFFICE.

JOSEPH E. CRISP, OF BOSTON, ASSIGNOR TO GEORGE W. COPELAND, OF MALDEN, MASSACHUSETTS.

BOOT-TREEING MACHINE.

SPECIFICATION forming part of Reissued Letters Patent No. 9,124, dated March 23, 1880.

Original No. 215,440, dated May 20, 1879. Application for reissue filed December 22, 1879.

*To all whom it may concern:*

Be it known that I, JOSEPH E. CRISP, of Boston, in the county of Suffolk and Commonwealth of Massachusetts, have invented an Improvement in Boot-Treeing Machines, of which the following is a specification.

Treeing, the final step in the manufacture of boots, is done entirely by hand; but patents have been granted for machines for doing this work, viz: No. 200,979, granted March 5, 1878, to Willard Comey; also, No. 204,662, granted on the 11th day of June, 1878, and No. 211,623, granted February 28, 1879, both to M. V. B. Ethridge. It is a particularly slow and arduous operation, and is practiced for the purpose of giving shape and symmetry to the boot-leg and upper by molding them upon a form, homogeneousness and stability by rubbing, smoothness and invariable texture by working a filling composition into the leather, and finish and uniform appearance by polishing. It involves the tempering of the boot upper and leg by moisture, straining and stretching the same upon a boot-tree, the smoothing of wrinkles and molding thereon under strain to secure the accurate fitting and adjustment thereto, the introduction of the filling composition, the drying of the boot upper and leg to remove the moisture received in tempering and to set the filling, and, finally, the polishing of the upper and leg with any suitable blacking. The rubbing is done by a rub-stick, generally held in both hands, and moved rapidly. This part of the work, with the stretching, calls for great exertion, and is exhaustive to the operator. By my machine the stretching and rubbing are done automatically.

This invention embraces, first, a novel boot-tree for presenting a boot upper and leg to smoothing and finishing appliances adapted to be heated and to be automatically separated or enlarged; second, a reciprocating smoothing and finishing tool or device shaped, adjusted, and arranged to automatically conform to all portions of the surface of the work operated upon; third, a rotating jack or turret for supporting and presenting one or more boot-trees to the smoothing and finishing appliances, provided with vertical movement, preferably by an elastic medium, in adjusting the work to the tool.

In the drawings, Figure 1 represents a perspective of my invention; Fig. 2, a vertical central section of boot-tree and jack. Figs. 3, 4, 5, and 6 illustrate, partly in section and partly by elevation, a portion of the construction of boot-tree and tool.

The boot-tree A, when adjusted in the jack B, is supported at its end by the socket $b$, is held therein by the point of the set-screw $b'$, which enters the segmental collar $b^2$, loosely fitted in the groove $a'$ upon the circumference of the boot-tree, thus giving it means for revolution upon its axis, and is locked in any desirable position by the set-screw $b^4$.

Any boot-tree can be used in combination with my improved jack and smoothing and finishing tool; but I prefer to employ one made of metal, arranged to be heated by hot air, water, or steam, and constructed so that its parts are spread automatically by steam or any like power.

The tree is made in two parts, $A'$ $A^2$. The part $A'$ is described in this application as arranged to be heated by steam and to carry spreading-pistons.

The piston-plugs $d'$ $d^2$ are connected by the tube $d^3$, substantially as shown in Fig. 2, and the steam is introduced through the same by the passage $a^2$. They may be so arranged and fitted in the tree that their expansion on being first heated will not cause them to lock the tree to prevent its revolution upon them, as they are immovable and do not revolve with the tree.

The passage $a^2$ extends through the plug and connecting-tube into the cylinder $a^3$, and the steam or other power introduced through said passage enters the cylinders $a^3$, $a^4$, $a^5$, and $a^6$, passing from cylinder to cylinder by connections $a^7$. As many cylinders may be employed as desired.

From the last cylinder in the series a channel opens into the chamber $a^8$, and the steam or other power, after operating the piston, passes into said chamber and out through passage $a^9$ in the lower part of the piston-plug $d'$. The inner end of this exit-passage can be fitted with a small discharge-pipe for draining the chamber.

The pistons $a^{10}$ each have a pointed projection, $a^{11}$, which may project to engage with the part $A^2$ of the tree when the same is fitted thereon. This part $A^2$ of the tree is furnished with wings $A^3$, which lap upon the part $A'$ upon either side, and give a continuous surface when the parts are separated, and is further provided with recesses that correspond in position and shape to the piston-projections $a^{11}$, which fit therein when the parts are together.

Most of the wrinkles in untreed boots occur above the instep, and the trees in use have the joint where the foot-piece is connected with the remainder of the tree at the commencement of the curve of the foot-piece above the instep. This construction requires great care in properly adjusting the boot on the tree. To effect an improvement for doing away with this care, the part $A'$ is provided with the instep portion of the foot, and the foot-piece is so hinged to it that the joint shall extend diagonally from the shank to a position just below the instep, the joint being so far below the instep that it clears all wrinkles in adjusting the boot upon the tree. This swinging foot-piece $A^4$ is preferably provided with the removable toe-piece $A^5$.

In adjusting a boot upon a boot-tree the hinged foot part $A^4$ is placed in line with the remainder of the part $A^2$, and the part $A^2$ is then inserted into the boot-tree, the foot part automatically adjusting itself within the upper of the boot. The part $A'$ is then inserted.

The operation of the boot-tree is as follows: A proper valve governing the induction-way is opened, allowing the passage of steam or other heating medium through the channels $a^2$ $a^7$, chamber $a^8$, and passage $a^9$, until the tree has acquired the desired temperature, when a valve governing the eduction-passage $a^9$ is closed, and the steam or other power then actuates the pistons $a^{10}$ to move them outwardly, and causes them to spread or separate the parts of the tree, and from this time the closing and separating of the parts are governed by the opening and closing valves, and the circulation caused by these manipulations will be enough to keep the tree at the temperature desired.

It will be observed that so long as the pressure is maintained in the tree by the closing, or partial closing, of the eduction-valve the parts will automatically separate as the rubbing progresses and take up the slack as fast as it is made—that is, the boot upper and leg will be under a constant and equable tension at all stages of the treeing so long as the pressure is applied.

It will be seen that by this method the strain upon the boot upper and leg can be applied gradually, thus doing away with the present system of creating a great strain upon the boot-leg before the rubbing is commenced; also, by presenting a series of trees with the boots thereon in succession, that while one is being operated upon by the tool the others can receive such attention from the operator as is necessary, it being my intention to heat the trees, adjust the first boot leg and upper upon the tree and present it to the rubbing-tool, adjust the next succeding upper and leg upon the tree while the first is being rubbed, and so on; and as it is generally necessary to subject the upper and leg to two rubbings, with a drying interval between, it will readily be seen that by the time the third or fourth upper and leg are adjusted upon the tree the first will be in a condition to receive its second rubbing.

By working the leather under heat less moisture is probably required to properly temper the same than when it is worked upon an unheated tree, and by providing a number of heated trees the work can be so rapidly dried that it will not be necessary to remove the tree from the jack, and the boot when finished is taken from the tree and an untreed boot substituted.

The rubbing and polishing device consists in a pad, C, having sides which may be slightly concave and edges somewhat rounded. This pad can be made of leather, wood, glass, stone, or metal, according to the nature of the surface operated upon or the finish of the work desired. It is pivoted at its center to and supported upon a curved arm, $c'$, which is pivoted at $c^2$ to a reciprocating carriage, $c^3$, and it is arranged to yield from a given position against the stress of the spring $c^4$; or the supporting-arm $c'$ may be rigidly attached to the carriage $c^3$, in which case the arm should constitute a spring.

The carriage $c^3$ is reciprocated in any desirable way, and I herein represent the same as supported upon the bar E and operated by the crank F and rod G.

The improved tool can be used in either of the following ways:

First, by causing the tool to travel in a given path, and by presenting the work to it. This can readily be accomplished by the aid of the revolving boot-tree and jack described.

Second, by supporting it upon a yielding arm, and providing it with means for revolution around the boot-tree.

Third, with a vertically-adjustable jack and a tree capable of revolution on its axis therein, for securing such adjustments of work to the tool or tool to the work as may be desired.

The method of use that I deem most practical is shown in Figs. 1, 3, and 4, by which a pair of yielding pads are so arranged that when not in use their sides contact.

In operation, the pads, after operating upon that part of the work first presented, are, by a suitable movement, advanced against the work, or the work-support moved in relation to them, so that they are caused to separate and continue their rubbing action upon the work upon both sides of the boot-tree in successive areas from the median line or surface upon which they first commenced to operate. The sections upon each side of the boot-tree are thus simultaneously finished, and by the gradual movement of the tools in relation to the work-support, or the work-support in relation to the tools, the entire surface of the work upon the boot-tree is gone over until the pads come together again upon the under side of the tree. Then the movement can be reversed and the operation gone through with again in reverse order.

The construction of and the method of supporting the pad are such that, in case any obstruction is presented by the work operated upon, the pad will either partially revolve or yield sufficiently to clear it, and thus prevent injury to the work, and, passing the obstruction, the pad will automatically present a surface to the work.

The jack B is provided with any number of sockets, *b*, and is supported upon the piston-rod $b^5$ and piston $b^6$, moved in the cylinder B′ by compressed air or other means. The movement of the piston and rod, when compressed air or other elastic force of like nature is employed, gives an elastic adjustment to the jack B, which is desirable when an unyielding reciprocating tool is used. This construction also provides for the free revolution of the jack in relation to the rubbing or finishing tool. The piston is operated by compressed air entering below it through proper passages, which need not be more fully described herein. This construction of the jack gives the boot-tree a yielding vertical and a horizontal adjustment in relation to the smoothing and finishing tool.

Any suitable means can be employed for fastening the jack in position while the rubbing tool or tools are in operation; and, as before observed, while the rubbing is progressing the operator can be applying the dressing to some other boot, or can be removing a finished boot from the boot-tree and replacing it with an untreed boot, and the boots previously rubbed may be drying while awaiting the next rubbing.

I have described the improved tool as used in connection with a boot-tree for the purpose of treeing boots; but I do not intend to confine myself to its use therewith, as it can be employed in smoothing, finishing, and polishing leather or other material upon a suitable form or bed or table for presenting the same to its action.

By the present method of treeing boots by hand the boot is tempered by being soaked in water. It is then adjusted upon the tree, besmeared with a filling composition and rubbed, then taken off and allowed to stand some time, put on again, dressed and rubbed, taken off, and oftentimes again put through the same manipulation, and, finally, finished with a suitable polish. This involves the removal of the boot from the tree at least twice, and perhaps three times.

By using a heated tree I can perform the entire treeing without removing the boot from the form; and, if it is desirable, the tree may be heated during one or more dressings and rubbings, and may be cold during the remainder of the process. This can be economically done by doing the first or first and second rubbings while the tree is heated for all the boots to be done in a single day, and then by shutting off the heating medium and introducing cold air or water to expand the tree, thus allowing the manipulation to be finished with a cold tree, or by using a tree expanded in the ordinary way.

By using a heated tree the leather will become pliable and adapt itself to the tree with little or no previous wetting, will more readily absorb the necessary filling, and is more readily and thoroughly stretched, so that less stock is necessary in making the boot.

For automatically expanding the boot-tree in the manner indicated I do not confine myself, of course, to the use of a heat-carrying power, but may use compressed air, cold water, or, in fact, any power that can be used in connection with the mechanical construction shown and described for operating the stretching devices; neither do I confine myself in the process of treeing boots under heat to the application of the heating medium in the manner herein set forth, as various other means may be employed for heating the tree to the desired temperature.

I am aware that Letters Patent No. 191,247, granted J. Miller May 29, 1877, describe a boot-tree having a movable foot-piece, which includes the entire instep and a portion which is embraced in the lower part of the piece $A^2$ of my boot-tree, which is hinged to the equivalent of the part A′ of my boot-tree.

I am also aware that the Patent No. 166,499, to Clay and Rankin, granted August 10, 1875, shows a movable foot-piece; but as neither of these devices shows or describes that portion of the foot-piece below the instep only as movable, they do not embrace the spirit of my invention.

I claim as my invention and desire to secure by Letters Patent—

1. An improved process or method in treeing boots, consisting in heating and expanding the tree by means of steam, or its equivalent, during the treeing operation, substantially as set forth.

2. A boot-tree adapted to be heated by steam, hot air, hot water, or other like heating medium, provided with a suitable chamber or chambers, an induction-way, $a^2$, and an eduction-way, $a^9$, whereby the circulation of the heating medium is attained and maintained, substantially as described, for the purposes set forth.

3. A boot-tree adapted to be heated by steam, hot air or water, or other like heating medium, having suitable chambers and an inlet and outlet passage or passages at the knee or upper end of the tree.

4. A boot-tree adapted to be heated by steam, hot water or air, or other like heating medium, and to revolve upon its axis, provided with a stationary central plug or piece containing the induction and eduction ways, substantially as and for the purposes described.

5. A boot-tree adapted to be heated by steam or hot air or water, made in two parts and provided with one or more pistons for spreading the parts operated by the heating medium, substantially as described.

6. A boot-tree having that portion of the foot-piece below the instep and extended to the shank hinged at the shank to the part $A^2$ of the tree, substantially as and for the purposes described.

7. In a boot-tree, the combination of the part $A^2$, provided with the instep projecting therefrom, as shown, and with the foot-piece $A^4$ hinged thereto, with the part $A'$, all combined and arranged substantially as and for the purposes described.

8. In a boot-tree adapted to be heated in the manner indicated, the combination of the part $A'$, provided with one or more pistons, actuated as described, with the part $A^2$, provided with the wings $A^3$, substantially as described.

9. In a boot-tree, the combination of two parts, one of which is adapted to be heated by steam, hot water or air, or other like heating medium introduced into its interior, and which is arranged to carry spreading devices, and the other of which is adapted to be heated by contact with the part and to be separated by the action of the spreading mechanism, substantially as described.

10. The combination, in a boot-tree, of the part $A'$, provided with the series of pistons, with the part $A^2$, all constructed and arranged so that upon their insertion within a boot and the application of the steam or equivalent power the parts may be automatically separated, and the boot-leg stretched by the outward movement of the pistons, substantially as described.

11. The combination, in a boot-tree, of the part $A'$, having a piston arranged to be moved outwardly by steam or other like power, and bearing the projection $a^{11}$, with the part $A^2$, provided with a recess corresponding in shape and location to said projection, all arranged substantially as and for the purposes described.

12. In a boot-treeing machine, the combination of a jack having a vertical movement arranged to present a boot-tree to a rubbing, smoothing, and finishing tool, said boot-tree, and a rubbing, smoothing, and finishing tool, substantially as and for the purposes described.

13. A jack arranged to receive, hold, and present one or more boot-trees to reciprocating rubbing, smoothing, and finishing appliances supported upon a piston automatically operated by compressed air or other suitable medium, in the manner specified.

14. The combination of a jack for presenting a boot-tree to the rubbing, smoothing, and finishing devices, a boot-tree adapted to be heated by steam, hot air, hot water, or other like medium, and said rubbing, smoothing, and finishing tool, all arranged to operate substantially as described.

15. A rubbing, smoothing, and finishing tool consisting of a block of any desirable material, pivoted at its center to a suitable support, and having sides of equal area and of uniform length, each of which is preferably somewhat rounded along its edges and at its corners, and also slightly concave, substantially as described.

16. The combination of a jack for holding and presenting a boot-tree to the rubbing, smoothing, and finishing mechanism, and a boot-tree with one or more rubbing, smoothing, and finishing tools adapted to automatically conform to the surface of the boot-tree from a given line, and to operate from said line upon succeeding areas by the relative change in position of boot-tree and tool, substantially as described.

17. The combination of a jack for supporting, holding, and presenting a boot-tree to a rubbing, smoothing, and finishing tool, and a boot-tree with a rubbing, smoothing, and finishing tool having two or more rubbing-surfaces so arranged that one automatically takes the place of the other while the tool is at work, substantially as described.

18. The combination of a reciprocating carriage or head, $c^3$, the yielding tool-carrying arm $c'$, and the tool $c$, all arranged in relation to each other substantially as described.

19. The combination of a suitable form or tree for presenting the work to a pair of rubbing, smoothing, and finishing elastic pads, with said elastic pads arranged to work simultaneously from a given line and to be separated by the change in position of the work in relation thereto, and means for supporting and reciprocating the same, substantially as described.

20. The combination of a jack provided with a socket, $b$, and set-screws $b'$ $b^4$ with a boot-tree having upon the end inserted within the socket a groove, $a'$, which carries a movable segmental collar or piece, $b^2$, with which the point of the set-screw $b'$ contacts, all arranged to provide the boot-tree with axial revolution, and a locking device for fastening the same in any desired position.

21. The combination of a jack for holding and presenting a boot-tree to reciprocating rubbing and polishing devices, a boot-tree adapted to be expanded during the treeing operation by steam, compressed air, water under pressure, or other equivalent power, and said reciprocating rubbing and polishing devices, all substantially as and for the purposes described.

22. A boot-tree adapted, by means substantially as described, to automatically spread or expand the boot during the treeing process.

23. The combination of a boot-tree adapted to spread the boot automatically during the treeing process with an operating-tool, substantially such as described, adapted to fit or finish the boot-leg upon the tree while under strain in successive sections parallel, or substantially parallel, to each other by the relative change in the position of tree and tool during the treeing process, substantially as specified.

24. In a boot-treeing machine, a jack for presenting two or more automatically-expansible boot-trees in succession to the fitting or finishing devices, having two or more holding devices, each of which is adapted to support a boot-tree at its knee end, substantially as and for the purposes described.

25. In a boot-treeing machine, a jack for presenting two or more boot-trees in succession to the fitting or finishing tool, provided with two or more sockets for holding the boot-tree at the knee end, each of which sockets is adapted to permit the revolution of the boot-tree thereon, substantially as described.

26. The improvement in the art of treeing boots consisting in heating the boot upon the boot-tree while under expansive pressure and then shaping it to the boot-tree by smoothing and finishing devices while heated, substantially as and for the purposes described.

27. The improvement in the art of treeing boots consisting in heating the boot upon the boot-tree and then applying the filling composition while the boot is heated, substantially as and for the purposes described.

J. E. CRISP.

Witnesses:
F. F. RAYMOND, 2d,
A. J. OETTINGER.